(12) United States Patent
Fukuyama et al.

(10) Patent No.: US 6,797,153 B1
(45) Date of Patent: Sep. 28, 2004

(54) CATALYST FOR HYDROCRACKING OF HEAVY OILS AND METHOD OF HYDROCRACKING HEAVY OILS

(75) Inventors: Hidetsugu Fukuyama, Chiba (JP); Koji Ohtsuka, Chiba (JP); Satoshi Terai, Chiba (JP); Shuhei Sawamoto, Chiba (JP)

(73) Assignees: Petroleum Energy Center, Tokyo (JP); Toyo Engineering Corporation, Tokyo (JP)

(*) Notice: Subject to any disclaimer, the term of this patent is extended or adjusted under 35 U.S.C. 154(b) by 0 days.

(21) Appl. No.: 09/560,047

(22) Filed: Apr. 27, 2000

(30) Foreign Application Priority Data

Apr. 28, 1999 (JP) .......................................... 11-122448
Mar. 8, 2000 (JP) ........................................ 2000-063526

(51) Int. Cl.$^7$ ............................................. C10G 47/00
(52) U.S. Cl. ............................. 208/58; 208/59; 208/64; 208/66; 208/67; 208/68
(58) Field of Search ............................. 208/58, 59, 64, 208/66, 67, 68

(56) References Cited

U.S. PATENT DOCUMENTS

| | | | |
|---|---|---|---|
| 3,715,303 A | 2/1973 | Wennerberg et al. | 208/112 |
| 3,812,028 A | 5/1974 | Wennerberg et al. | 208/112 |
| 3,900,390 A * | 8/1975 | Adams et al. | 208/209 |
| 4,755,280 A * | 7/1988 | Hudson et al. | 208/89 |
| 5,358,634 A | 10/1994 | Rankel | 208/251 H |
| 5,364,524 A | 11/1994 | Partridge et al. | 208/251 H |
| 5,374,350 A | 12/1994 | Heck | 208/143 |
| 5,494,568 A * | 2/1996 | Simpson | 208/216 PP |
| 5,529,968 A | 6/1996 | Sudhakar et al. | 502/185 |
| 5,624,547 A * | 4/1997 | Sudhakar et al. | 208/89 |
| 5,676,822 A | 10/1997 | Sudhakar | 208/143 |
| 5,866,501 A | 2/1999 | Pradhan et al. | 502/338 |
| 5,928,501 A | 7/1999 | Sudhakar et al. | 208/263 |

FOREIGN PATENT DOCUMENTS

| | | | |
|---|---|---|---|
| JP | 6-165935 | 6/1994 | |
| JP | 09234370 A * | 9/1997 | B01J/27/43 |
| JP | 9-235569 | 9/1997 | |

OTHER PUBLICATIONS

George A. Olah et al, Hydrocarbon Chemistry, 1995, pp. 6–8.*

*Hydroprocessing of Heavy Oil over CoMo/Carbon Supported Catalysts*, by Lillian A. Rankel, Energy & Fuels 1993, vol. 7, pp. 937–942.

* cited by examiner

Primary Examiner—Walter D. Griffin
Assistant Examiner—James Arnold, Jr.
(74) Attorney, Agent, or Firm—Flynn, Thiel, Boutell & Tanis, P.C.

(57) ABSTRACT

A catalyst for the hydrocracking of heavy oils contains iron and active carbon having an MCH conversion rate of 40–80%, a specific surface area of 600–1000 m$^2$/g of, a pore volume of 0.5 to 1.4 cm$^3$/g, 2–50 nanometers' mesopore volume of not less than 60% and an average pore diameter of 3–6 nanometers, the iron being carried on the active carbon in an amount of 1 to 20 wt. % to the active carbon. The hydrocracking process using the catalyst includes a first step of conducting hydrocracking at a temperature within the range of 360–450° C. at a hydrogen partial pressure of 2–14 MPaG and a second step of conducting hydrocracking at a temperature within the range of 400–480° C. at a hydrogen partial pressure of 2–18 MPaG, which can suppress the generation of coke and remove, in a high efficiency, heavy metals such as Ni and V, asphaltene, residual carbon, sulfur and nitrogen from the heavy oils.

22 Claims, 1 Drawing Sheet

A: INJECTOR
B: TEMPERATURE ADJUSTMENT DEVICE
C: DETECTOR
D: RECORDING DEVICE

A: INJECTOR

B: TEMPERATURE ADJUSTMENT DEVICE

C: DETECTOR

D: RECORDING DEVICE

CATALYST FOR HYDROCRACKING OF HEAVY OILS AND METHOD OF HYDROCRACKING HEAVY OILS

BACKGROUND OF THE INVENTION

1. Field of the Invention

The present invention relates to a method of hydrocracking heavy oils or extraheavy oils with the generation of coke being suppressed. More specifically, the present invention relates to a method of hydrocracking heavy oils or the like wherein the generation of coke is suppressed in the presence of pressurized hydrogen and a catalyst comprising active carbon having specific properties and comprising iron carried on the active carbon, and heavy metals such as Ni and V, asphaltene, residual carbon, sulfur, nitrogen and the like in the heavy oil or extraheavy oil, are removed by cracking and subjected to a heat treatment.

2. Description of the Related Art

Recently, as the world-wide trend in the petroleum refinery industry, the proportion in production of light-weight products is increasing. Accordingly, it is becoming more and more important, from the standpoint of effective utilization of resources, that heavy oils or extraheavy oils such as atmospheric distillation-residual oils, vacuum distillation-residual oils, catalytically cracked residual oils, oil sand oils and coal-liquefied oils and the like, which remain after removing valuable light-weight fractions, can be hydrocracked and further converted into useful intermediate fractions.

There have been a number of reports about the hydrocracking of heavy oils by using catalysts. As one example of upgrading heavy oils by using catalysts containing active carbon having specific properties with a metal carried thereon, U.S. Pat. No. 5,358,634 and U.S. Pat. No. 5,364,524 have been proposed.

In U.S. Pat. No. 5,358,634, a process of hydrocracking heavy hydrocarbon oils by using an active carbon catalyst having specific properties is disclosed. This is a method of cracking a heavy hydrocarbon oil which contains no less than 70% of a heavy oil content having a boiling point of not lower than 343° C. in a fixed-bed reactor. The reference suggests that, according to the method, under the existence of active carbon having at least 0.2 cc/g of pore volume and at least 50 m$^2$/g of surface area of a pore distribution range of 10–40 nanometers, the average pore diameter being 4 to 5.4 nanometers, the heavy metal (Ni and V) removal rate is at least 59%, the desulfurization rate is at least 9.5%, the residual carbon decomposition rate is at least 13.5% and the removal rate of asphaltene defined as a content insoluble to pentane is at least 10%.

U.S. Pat. No. 5,364,524 discloses a process of hydrocracking a heavier oil. This is a method of hydrocracking a heavy hydrocarbon oil which contains no less than 97% of a heavy oil content having a boiling point of not lower than 343° C. in a fixed-bed reactor. The reference suggests that, according to the method, under the existence of a catalyst in which Mo (or W) and Co (or Ni) are carried on an active carbon carrier having properties including at least 0.2 cc/g of pore volume and at least 50 m$^2$/g of surface has a pore distribution range of 10–40 nanometers, the average pore diameter being 4 to 6 nanometers, at least 23% of Ni and V can be removed.

These prior arts are clearly different from the present invention which will be described below, in terms of the properties of the catalyst, the types of metals carried on the catalyst, the type of the reactor, as well as the heavy metal removal rate and the residual carbon decomposition rate.

On the other hand, the applicant of the present invention has proposed in JP-A 6-165935 a method in which hydrocracking with a relatively small amount of hydrogen consumption is made possible by using, as the hydrocracking catalyst for heavy oils, a catalyst in which metal active components such as nickel and iron selected from group VIII in the periodic table are carried on active carbon produced from brown coal as a carrier. However, according to this method, as heavy oils are hydrocracked at only one stage in the process, it is difficult to reduce the amount to be used of the catalyst and suppress the generation of coke at a high conversion rate.

In addition, the applicant of the present invention has proposed in JP-A 9-235569 a method of hydrogenating heavy oils at two stages as one of the improved versions of the technique belonging to catalytic hydrocracking. In order to carry out the hydrocracking of heavy oils in two stages, this method comprises: a first step of adsorbing a coke precursor and coke into a coke adsorbent to remove them, the coke precursor and the coke being obtained by carrying out a thermal decomposition of the heavy oil under the existence of 2 to 10 wt. % of the coke adsorbent to the feedstock oil and hydrogen; and a second step of carrying out a thermal decomposition of the substantially whole amount of the thermally decomposed oil obtained by the first step from which the coke precursor and the coke have been removed, under the presence of hydrogen, iron compounds and active carbon having properties such as a MCH conversion rate of 45–85%, specific surface area of 800–1000 m$^2$/g, pore volume of 0.7 to 1.4 cm$^3$/g, mesopore (2–50 nanometers) volume of not less than 70% and average pore diameter of 3–6 nanometers. The coke adsorbent of the first step comprises: at least one carbon material selected from the group consisting of brown coal, brown coal char, petroleum cokes, active carbon, carbon black and graphite; and at least one member of iron compounds selected from the group consisting of iron sulfide, iron oxide and natural pyrite. At the first step, the carbon material and the iron compounds are present in a simply mixed state in the heavy oil. The iron compound of the second step includes at least one member of compounds selected from the group consisting of iron sulfide, iron oxide and natural pyrite. At the second step, the active carbon and the iron compounds in the thermally decomposed oil are present in a simply mixed state. However, in the method of simply mixing the carbon material and the iron compounds in the hydrogenation of heavy oils at two stages as disclosed in JP-A 9-235569, since the density of the carbon material and that of the iron compound differ from each other and, as the reaction proceeds, each density varies according to the amount of coke precipitated and heavy metals deposited on the carbon material and the iron compound, selection of the conditions in fluidization operation using gases and liquids for homogeneously dispersing the catalyst becomes complicated and difficult.

In the method in which the carbon material and the iron compounds are present in heavy oils in a simply mixed state, if the conditions in fluidization operation are selected such that the catalysts are homogeneously dispersed in the reactor, a suspension type or slurry bed may be selected and the catalysts flow out of the reactor with gases and cracked oils. In a case in which there is a preposition that catalysts are disposed of after use, such a suspension type may not be a problem. However, if re-use of the catalysts which still keeps a sufficient level of activity is intended, it is necessary to separate the catalysts which have flowed out of the reactor from the cracked oils and to recycle the separated catalysts to the reactor, which makes the process complicated.

In the RFCC processes for increasing production of the gasoline fraction and the process of hydrodesulfurizing feedstock to be supplied to the RFCC processes, when a feedstock which contains a relatively high amount of residual carbon content and metals such as Ni and V is supplied, some of the residual carbon and metals poison the catalyst and deterioration of the catalysts occurs, although the degree of the deterioration depends on the feedstock to be supplied. Conventionally, in hydrodesulfurizing, a step of removing Ni and V, in what is called a guard reactor, is provided prior to the hydrodesulfurization in order to reduce deterioration of the catalysts due to deposition of Ni and V and precipitation of coke on the catalysts. In the case of the catalyst used here, the pores of the alumina carrier are made larger so that a relatively large molecule of asphaltene, which contains Ni and V, be decomposed and thus Ni and V be removed. However, the catalytic ability is not sufficient and complicated operations including frequent switching of the reactor, constant supply/removal of the catalysts and the like are frequently necessitated, in order to replace the catalysts which have been deactivated due to precipitated coke and deteriorated due to deposition of Ni and V thereon.

Lillian A. Rankel, Energy & Fuels 1993, 7, 937–942 discloses properties of a catalyst containing active carbon with metals carried thereon, i.e., a CoMo/carbon catalyst, whose properties are shown in Referential Example 1 described hereinafter. In this catalyst, the V removal rate is equal as compared with the catalyst of the present invention, but the conversion rate is suppressed at a low level in order to prevent generation of coke. In addition, the Ni removal rate, the desulfurization rate and the residual carbon removal rate thereof are also suppressed at a relatively low level. Accordingly, it is obvious that the performances of the catalyst of the present invention are more excellent than those of the aforementioned catalyst.

Further, it is difficult to process used alumina catalysts on which Ni and V have been accumulated. Expecting that, in the future, crude oil will probably become heavier, that is, contain more heavy metals, more residual carbon and the like, when materials containing more heavy metals, asphaltene and residual carbon, etc. will be supplied under such a circumstance, it has been desired that a technique which enables, with a high efficiency, removal of heavy metals from the feedstock and decomposition of asphaltene, residual carbon etc. in the aforementioned process is developed.

In short, excellent techniques for processing extraheavy oils which contain a significantly large amount of impurities, such as heavy metals (Ni and V), asphaltene and residual carbon, will become essential in future.

Catalysts can be used in a fixed-bed. However, when extraheavy oils are processed, especially, since heavy metals like Ni and V as impurities contained at a high percentage in the extraheavy oils are more likely to deposit on the catalysts and cokes generated from asphaltene and residual carbon are more likely to precipitate, it is very important that the catalysts are homogeneously dispersed in the reactor and the fluid state thereof is sufficiently maintained so that the reaction temperature be evenly maintained and partial retention of the deposits and precipitates be prevented.

SUMMARY OF THE INVENTION

The object of the present invention is to propose means for solving all of the aforementioned problems at the same time.

The inventors of the present invention have, as a result of assiduous study for solving the problems of the prior art, discovered that, by using a catalyst in which iron is carried on active carbon, the catalyst can be effectively used until the catalyst loses its activity without allowing the catalyst to flow out of the reactor and the reaction temperature can be evenly maintained and partial retention of the deposits and precipitates can be prevented because conditions in fluidization operation by gases and liquids can be easily selected and homogeneous dispersion of the catalyst and a fluid state can be sufficiently maintained, thereby allowing the catalyst to demonstrate its full capacity as a catalyst in achieving suppression of coke-generation and removing heavy metals. The invention has been completed on the basis of these discoveries.

That is, the present invention discloses a catalyst for the hydrocracking of heavy oils, comprising iron and active carbon having properties of an MCH conversion rate of 40–80%, a specific surface area of 600–1000 $m^2/g$, a pore volume of 0.5 to 1.4 $cm^3/g$, a 2–50 nanometers' mesopore volume of not less than 60% and an average pore diameter of 3–6 nanometers, the iron being carried on the active carbon in an amount of 1–20 wt. % with respect to the active carbon.

In addition, the present invention discloses a method of hydrocracking heavy oils and the like by using the aforementioned catalyst, which comprises the first step of conducting hydrocracking at a temperature within the range of 360–450° C. at a hydrogen partial pressure of 2–14 MPaG and the second step of conducting hydrocracking at a temperature within the range of 400–480° C. at a hydrogen partial pressure of 2–18 MPaG.

Further, the present invention discloses a method of hydrocracking the heavy oils and the like, wherein in the first and second steps, the concentration of the catalyst is 6–40 wt. % of the oil or oil having been treated by heating.

Also, use of the catalyst to hydrocrack heavy oils is provided.

The present invention exhibits excellent effects in hydrocracking of heavy oils, and especially exhibits distinguished effects in hydrocracking of extraheavy oils.

Heavy oils and the like include heavy oils and extraheavy oils, or oil sand oils, oil shale oils, coal-liquefied oils and the like. The heavy oils and extraheavy oils are residual oils, such as atmospheric distillation residual oils, vacuum-distillation residual oils and catalytically cracked residual oils, derived from crude oil or petroleum. As the heavy oils, Middle-Eastern based Arabian heavy, Basra, Kafdi, Iranian heavy and the like are used. As the extraheavy oils, Maya produced in Mexico, Athabasca oil sand bitumen and Cold Lake oil sand bitumen produced in Canada, Orinoco tar, Cerro Negro, Zuata, Bachaquero and Boskan produced in Venezuela, Marlim produced in Brazil and the like are used.

As a material of the active carbon having specific properties of the present invention, brown coal is used. Examples of brown coals include Yallourn coal, Morwell coal whose ash content has been reduced to less than 3 wt. % and the like.

DETAILED DESCRIPTION OF THE INVENTION

Figure 1:
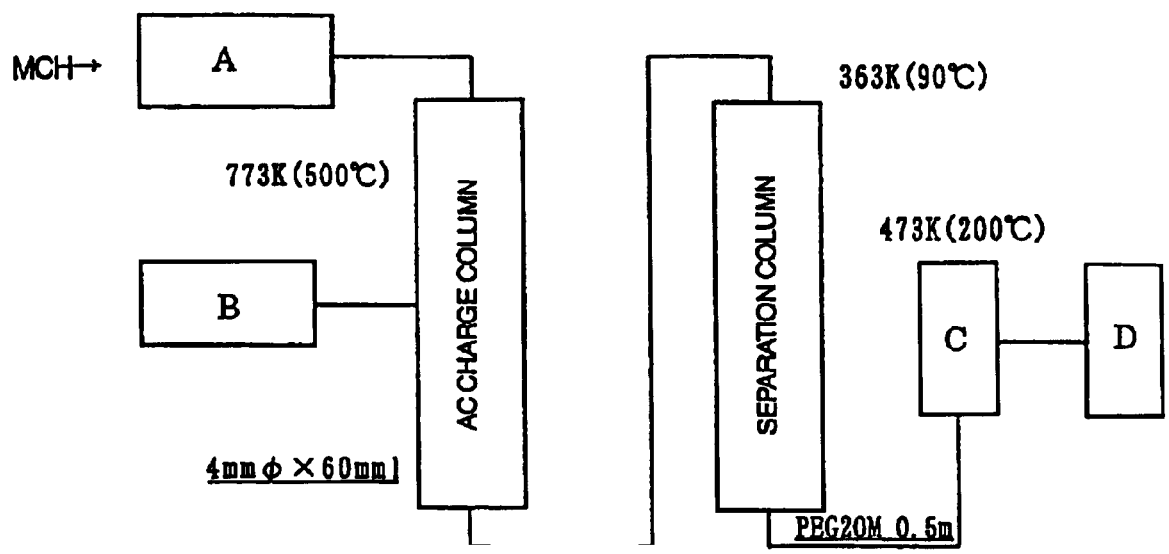
FIG. 1 is a schematic diagram which shows an MCH conversion-rate measuring device.

Next, an embodiment of the present invention will be described in detail. As methods of producing, from brown coal, active carbon for hydrocracking of heavy oils having specific properties according to the present invention (which will be referred to simply as "the active carbon having specific properties" hereinafter), a method of activation by using a rotary kiln or a fluidized bed is generally known. Here, as a representative example, a method in which the brown coal is activated by using a commercially available rotary kiln and by the method using steam or mixed fluids of steam or air will be described. However, mixed fluids of steam, air and carbon dioxide (which will be referred to as "oxidative gas") may optionally be used.

First, in a case in which steam is used as the fluid activator, a predetermined amount of brown coal is charged in a kiln and the brown coal is kept under a flow of steam at 600° C. for 1 hour. For example, steam may be flowed at a flow rate of 3.5–12g/minute with respect to 190 g of the charged brown coal and the material is kept under the flow of steam at 600° C. for 1 hour. Note that this "1 hour" steam flowing is carried out for removing water and water vapor contained in the brown coal and the time duration thereof is not particularly limited to "1 hour". When the temperature of the rotary kiln has become stable, the process shifts to a temperature-programming process. It should be noted that, although the temperature maintained in the kiln varies as a result of using various fluid activators as described below, this first process is carried out in the same manner.

Next, in the temperature-programming process, the temperature is raised at a rate of 10° C./minute until the temperature reaches a predetermined value. When the temperature has reached the predetermined value, it is maintained for a predetermined time. Here, the predetermined temperature is within the range of 700 to 1000° C. The predetermined time means a time counted after the temperature has reached the predetermined temperature and is selected from 3 hours to 0 hour. The fixed carbon decreasing rate, which is defined by the formula below, is determined according to the combination of the total amount of the fluid activators and the activation temperature. These definitions are common in the fluid activators described below, as well.

Second, in a case in which mixed fluids of steam and air are used as the fluid activator, steam may be flowed at a flow rate of 3.5–12 g/min with respect to 190 g of the charged brown coal. In a case in which air is used as the fluid activator, it is preferable that no more than 4 vol. % of oxygen is contained in the mixed fluids, and the predetermined temperature is selected from the range of 500 to 700° C. and the predetermined time is selected from the range of 120 to 10 minutes. When the oxygen content exceeds 4 vol. %, the volume proportion of mesopores whose pore diameter is within the range of 2 to 50 nanometers is decreased in the obtained active carbon and the volume proportion of macropores is increased, which should be avoided. In a case in which an oxidative gas is used as the fluid activator, it is also preferable that no more than 4 vol. % of oxygen is contained in the oxidative gas, and the predetermined temperature is selected from the range of 500 to 700° C. and the predetermined time is selected from the range of 120 to 10 minutes.

In any of the aforementioned fluid activators, physical properties described below can be determined based on the fixed carbon decreasing rate as defined by the following formula, regardless of the predetermined temperature and time:

$$\text{Fixed Carbon Decreasing Rate (wt. \%)} = 100 \times \left[ 1 - \frac{\left( \begin{array}{c} \text{Fixed Carbon Amount of the Sample} \\ \text{obtained after activation } (g) \end{array} \right)}{(\text{Fixed Carbon Amount in Raw Material } (g))} \right]$$

The physical properties of the active carbon obtained in the aforementioned manner were measured by the basic measurement method for catalysts. Specifically, the specific surface area and the pore volume according to BET (adsorption) process, and the pore distribution and the average pore diameter according to B. J. H. method were measured by the method described in "Shokubai Kogaku Koza 4, Chibito Shokan, 1978. Here, the average pore diameter means a value which is calculated as 4V/S wherein "V" is the pore volume and "S" is the specific surface area. The volume rate (%) occupied by mesopores whose diameter is within the range of 2 to 50 nanometers standardized by the International Union of Pure and Applied Chemistry (IUPAC) was also obtained.

The MCH conversion rate was measured by a catalyst performance measuring device as shown in FIG. 1, which is well known by persons skilled in the art. The MCH conversion rate is a ratio of "the peak area in which methyl cyclohexane (MCH) is dehydrogenated and becomes toluene" to "the whole peak area". Approximately 0.2 g of active carbon was charged in a reaction tube and the reaction temperature was kept at 500° C.±1° C. 0.4 $\mu$l of Methyl cyclohexane (MCH) was injected by a micro syringe. The other necessary measurement conditions were as follows.

| | |
|---|---|
| Amount of injected MCH; | 0.4 $\mu$l |
| Dehydrogenation reaction temperature (AC charge column temperature); | 500° C. |
| Amount of charged sample active carbon; | 0.2 g |
| Separation column temperature; | 90° C. |
| Carrier gas (N$_2$) secondary pressure; | 270 KPa |

The active carbon of the present invention is selected from those having properties of an MCH conversion rate of 40–80%, a specific surface area of 600–1000 m$^2$/g, a pore volume of 0.5 to 1.4 cm$^3$/g, a mesopore (whose diameter is 2–50 nanometers) volume of not less than 60% and the average pore diameter of 3–6 nanometers.

As the brown coal for producing the active carbon of the present invention, Yallourn coal and Morwell coal whose ash content has been reduced to less than 3 wt. % are preferably selected.

As the method by which iron is impregnated on the active carbon produced by the aforementioned method, the generally known impregnation-evaporation to dryness method was employed using an aqueous solution of iron compounds. Preferably, the active carbon having the aforementioned properties is soaked in an aqueous solution of iron nitrate and then subjected to evaporation to dryness. After that, the nitrate is thermally decomposed in a nitrogen atmosphere, thereby obtaining the active carbon catalyst with iron carried thereon.

In general, catalysts used for hydrocracking of heavy oils have to be subjected to pre-sulfurization of the catalyst metals in advance, then activated, prior to use of the catalysts. However, the active carbon catalyst with iron carried thereon which is produced in the aforementioned manner, has an advantage that the activation is not required because the catalyst reacts with the sulfur contained in the heavy oils and is sulfurized during the hydrocracking of the heavy oils. In the present invention, the amount of iron to be carried on the active carbon is preferably 1 to 20 wt. % with respect to the active carbon. When the amount exceeds 20 wt. %, the dispersion of iron carried on the active carbon is deteriorated, resulting in insufficient exhibition of iron sulfide as an activation species after being reduced in the reaction site. In hydrocracking, the reaction of hydrogenation could be supplementarily adjusted by pressure, but in such a case, the pressure may exceed the economical range in terms of equipment design. Therefore, the most preferable amount of iron to be carried on the catalyst needs to be provided.

On the other hand, when the amount of the iron is no more than 1 wt. %, as described below, the hydrogenation effect of iron with respect to hydrocarbon radicals adsorbed in the active carbon is insufficient, and in the case of extraheavy oils, generation of coke is increased, especially due to polycondensation.

Next, a reaction test with respect to the first step and the second step of the present invention will be described.

In the reaction test, a flow reaction device was used in which the first and second steps were carried out by changing the amount of iron carried on the active carbon and the concentration of the iron-carrying active carbon.

In the process of cracking heavy oils, bonding between hydrocarbons having a relatively large molecular weight is broken and hydrocarbon radicals are generated. These hydrocarbon radicals are quite reactive and cause chain reactions. As a result, on one hand, the reaction in which heavy oils is made lighter due to cracking proceeds exceedingly well and generation of gases increases, thereby reducing the yield of fractions of desired naphtha, kerosene, gas oils and the like. On the other hand, the hydrocarbon radicals bond with each other and the polycondensation reaction proceeds as well, eventually producing coke. In cracking extraheavy oils containing a relatively large amount of asphaltene, in particular, these chain reactions can be suppressed by adding hydrogen to the hydrocarbon radicals at timings when the polycondensation reaction predominantly proceeds.

Iron acts on prompting addition of hydrogen to the hydrocarbon radicals and stabilizing the hydrocarbon radicals. The active carbon mildly adsorbs the hydrocarbon radicals, and the adsorbed hydrocarbon radicals are stabilized after having hydrogen added thereto by iron carried on the active carbon. The hydrocarbon radicals then leave the active carbon and then are effectively converted into fractions such as naphtha, kerosine, gas oil and the like.

As extraheavy oils contain a relatively large amount of asphaltene content which easily becomes coke as a result of the polycondensation reaction, realizing the effective catalyst function can be expected here, in particular, by using the active carbon having well developed mesopore structures which have a high adsorption capacity and iron carried on the active carbon.

In the first process, the active carbon catalyst having iron carried on the active carbon was charged and hydrocracking was carried out, while hydrogen was continually supplied in the conditions described below. A catalyst in which 1 to 20 wt. % of iron was carried on the active carbon was used and the concentration of the catalyst was adjusted within the range of 6 to 40 wt. % with respect to the oil which was present in the reactor. When the concentration exceeds 40 wt. % with respect to the oil, fluidity of the oil extremely deteriorates, which is not practically preferable.

The reaction temperature in the first process is normally in the range of 360 to 450° C. and preferably in the range of 400 to 440° C. The reaction pressure is preferably selected within the range of 2 to 14 MPaG, and more preferably within the range of 5 to 12 MPaG. In this case, the reaction pressure needs to be provided under the pressure of hydrogen gas.

There is no particular limitation to the type of reaction. Examples of the reaction type include fixed bed, moving bed, suspension bed (or slurry bed) and ebullating bed. Any of these examples may be employed, but a completely-stirred tank reactor such as the suspension bed and the ebullating bed is preferably employed.

Then, substantially the whole amount of the cracked oil obtained by the first process in the aforementioned manner is subjected to hydrocracking in the second process.

In the second process, the iron-carrying active carbon catalyst of the present invention was charged and hydrocracking was carried out with continually supplying hydrogen in the conditions described below.

A catalyst in which 1 to 20 wt. % of iron was carried on the active carbon was used and the concentration of the catalyst was adjusted within the range of 6 to 40 wt. % to the oil which was present in the reactor. When the concentration of the catalyst exceeds 40 wt. % with respect to the oil, fluidity of the oil extremely deteriorates, which is not practically preferable. The reaction temperature in the second process is normally selected in the range of 400 to 480° C. and preferably in the range of 410 to 450° C. The reaction pressure is preferably selected within the range of 2 to 18 MPaG, and more preferably within the range of 7 to 12 MPaG. In this case, the reaction pressure needs to be provided under the pressure of hydrogen gas.

There is no particular imitation to the type of reaction. Examples of the reaction type include fixed bed, moving bed, suspension bed (or slurry bed) and ebullated bed. Any of these examples may be employed, but a completely-stirred tank reactor such as the suspension bed and the ebullating bed is preferably employed.

The whole amount of the cracked products was filtered by a 5-micron filter, and the obtained residue was subjected to toluene extraction by using a Soxhlet apparatus and vacuum dried for 1 hour under conditions of 8–15 torr and 130° C. The amount of coke produced in the oil was determined as the toluene insoluble amount obtained as a result of weight measurement of the vacuum dried residual.

In particular, with respect to the stability evaluation of the obtained product oil, the spot test method of the Nisseki type was employed. The Nisseki type spot test is a method which was proposed in order to evaluate the stability of heavy oils for ships commonly used as fuel oil for ships. Stability of the oil is evaluated by ranking the oil in the range of No. 1 to No. 6 according to the amount of sludge contained in the heavy oil. In this index, the larger the rank number, the larger amount of sludge is supposed to be contained in the heavy oil, thereby becoming less stable.

The hydrocracking method of the present invention achieves the following effects in producing light hydrocarbons by hydrocracking heavy oils or (in particular) extraheavy oils of poor quality containing a relatively large amount of asphaltene, residual carbon and the like.

(1) Ni and V as heavy metal contents in the oil can be removed without heavily depending on the hydrocracking rate. The residual carbon decomposition rate and the asphaltene (which is defined as the content insoluble to heptane) decomposition rate can be increased according to the hydrocracking rate of the oil and thus generation of coke can be suppressed when the conversion rate is relatively high. Accordingly, light hydrocarbons containing a relatively large amount of useful intermediate fractions can be produced with a high liquid yield. In addition, the properties of the oil are excellent.

(2) Ni and V as heavy metal contents in the oil can be selectively removed. Accordingly, the present invention can be utilized as the catalyst to be charged in a "guard reactor" which is provided upstream of a desulfurizing process or the like, in order to remove heavy metals from heavy oils or the like.

The range of the boiling point of the oil was measured by a gas chromatography distillation device (GCD method). After determining the yield of each fraction, the conversion rate was calculated. The amount of produced coke was compared with the conversion rate obtained as described above and the catalyst performance was evaluated.

The properties of the produced oil and the like obtained in the aforementioned manner were measured according to the standard methods used for petroleum products.

EXAMPLES

The present invention will be further described in detail by examples. Needless to say, the present invention is not limited to the examples described below.

Preparation Example 1

190g of Yallourn brown coal char was charged as a raw material into a rotary kiln. Water and vapor content was removed by keeping the material under a flow of steam at a flow rate of 3.5 g/min at 600° C. for 1 hour. The activation was carried out at 8500C. for 150 minutes. The active carbon "B" prepared in this manner was soaked in an aqueous solution of iron nitrate and then subjected to the evaporation to dryness treatment, so that 10 wt. % of iron, to the amount of the active carbon, was carried on the active carbon. Thereafter, the nitrate-decomposition was carried out in a nitrogen atmosphere at 400° C. for 1 hour, obtaining an active carbon "A" in which iron was carried on the active carbon. The properties of the iron-carrying active carbon "A" and those of the active carbon "B" are shown in Table 1.

TABLE 1

Properties of Active Carbon Catalysts

|  | MCH Conversion Rate (%) | Specific Surface Area (m²/g) | Mesopore volume φ 2–50 nanometer (%) | Average Pore Diameter (nanometer) | Amount of Carried Iron (wt %) | Pore Volume (cm³/g) |
|---|---|---|---|---|---|---|
| Iron-carrying Active Carbon "A" | 45 | 686 | 76 | 3.6 | 10 | 0.6 |
| Active Carbon "B" | 52 | 830 | 91 | 4.8 | — | 1.0 |

Example 1

A Middle-Eastern based mixed vacuum-distillation residual oil having the properties shown in Table 2 was used as the feedstock. In a completely-stirred tank type-flow reaction test device capable of the first process and the second process, the iron-carrying active carbon "A", in which the iron was carried in an amount of 10 wt. % to the active carbon was charged so that the 25 wt. % of the iron-carrying active carbon "A" was charged, with respect to the oils present in the reactor to be processed. A reaction test was carried out, as shown in Table 3, in the conditions in which the reaction temperature and the reaction pressure in the first process were 418° C. and 10 MPaG, respectively, and the reaction temperature and the reaction pressure in the second process were 434° C. and 10 MPaG, respectively. As a result, as shown in Table 3, the amount of produced coke was 0.08 wt. % while the conversion rate of the fractions whose boiling point was no less than 525° C. was 88.4%. The experimental conditions and results are shown in Table 3.

Examples 2–7

The experimental conditions and results of Examples 2–7 are shown in Table 3.

Examples 8–11

Athabasca bitumen vacuum-distillation residual oil produced in Canada which has the properties shown in Table 2 and whose (Ni+V) concentration is 1.75 times as much as that of the Middle-Eastern based mixed vacuum residual oil was used as the feedstock. The experimental conditions and results are shown in Table 4.

Examples 12–14

Cerro Negro atmospheric distillation residual oil produced in Venezuela which has the properties shown in Table 2 and whose (Ni+V) concentration is 2.75 times as much as that of the Middle-Eastern based mixed vacuum-distillation residual oil was used as the feedstock. The experimental conditions and results are'shown in Table 4.

Examples 15 and 16

Maya vacuum-distillation residual oil produced in Mexico which has the properties shown in Table 2 and whose (Ni+V) concentration is 3.26 times as much as that of the Middle-Eastern based mixed vacuum-distillation residual oil was used as the feedstock. The experimental conditions and results are shown in Table 4.

Examples 17 and 18

5 wt. % of iron and 18 wt. % of iron with respect to the active carbon were carried on the active carbon, respectively. Maya vacuum-distillation residual oil produced in Mexico was used as the feedstock. The experimental conditions and results are shown in Table 5.

Examples 19 and 20

The concentration of the catalyst was set at 35 wt. % and 10 wt. %, respectively. Maya vacuum-distillation residual oil produced in Mexico was used as the feedstock. The experimental conditions and results are shown in Table 5.

Referential Example 1

In the reference, Lillian A. Rankel, Energy & Fuels 1993, 7, 937–942, a catalyst in which metals are carried on active carbon, that is, a CoMo/carbon catalyst, was used and the atmospheric distillation residual oil having the properties shown in Table 6 was subjected to hydrocracking in a fixed-bed reactor to remove heavy metals. As a result, the residual carbon decomposition rate of 43% and the Ni removal rate of 69% were observed with respect to the conversion rate of 52%.

Referential Example 2

A conventional catalyst of a CoMo/alumina carrier described in the reference, Lillian A. Rankel, Energy & Fuels 1993, 7, 937–942, was used. The atmospheric distillation jar, residual oil having the properties shown in Table 6 was subjected to hydrocracking in a fixed bed reactor and heavy metals were removed. As a result, the residual carbon decomposition rate of 50% and the Ni removal rate of 56% were observed with respect to the conversion rate of 50%.

Comparative Example 1

A Middle-Eastern based mixed vacuum-distillation residual oil having the properties shown in Table 2 was used as the feedstock. In an autoclave reactor, 4 wt. % of brown coal char and 3 wt. % of iron sulfide as iron were charged with respect to 100 wt. % of the oil which was present in the reactor to be processed, and the hydrocracking of the first process was carried out. Thereafter, 5 wt. % of the active carbon "B", whose properties are shown in Table 1, was added to effect the second process. The reaction conditions and results are shown in Table 7. According to the results, the amount of produced coke was 3.4 wt. % while the conversion rate of the fractions whose boiling point was no less than 525° C. was 88.2%.

Comparative Example 2

A Middle-Eastern based mixed vacuum-distillation residual oil having properties shown in Table 2 was used as the feedstock. In an autoclave reactor, 5 wt. % of the iron-carrying active carbon "A", whose properties are shown in Table 1, was charged with respect to 100 wt. % of the oil which was present in the reactor to be processed, and the hydrocracking was carried out. The reaction conditions and results are shown in Table 7. According to the results, the amount of produced coke was 10.3 wt. % while the conversion rate of the fractions whose boiling point was no less than 525° C. was 84.1%.

Comparative Example 3

An operation which was similar to that in Example 1 except for including only the first process was carried out and the hydrocracking test was done. The experimental conditions and results are shown in Table 3. The amount of produced coke was 0.39 wt. % while the conversion rate of the fractions whose boiling point was not less than 525° C. was 74.5%. The rank of stability of the produced oil according to the Nisseki type spot test was No. 4.

Comparative Example 4

0.8 wt. % of iron was carried on the active carbon and Maya vacuum residual oil produced in Mexico was used as the feedstock. The experimental conditions and results are shown in Table 5.

Comparative Example 5

23 wt. % of iron was carried on the active carbon and Maya vacuum-distillation residual oil produced in Mexico was used as the feedstock. The experimental conditions and results are shown in Table 5.

Comparative Example 6

The concentration of the catalyst was set at 4 wt. % with respect to the processed oil, and Maya vacuum-distillation residual oil produced in Mexico was used as the feedstock. The experimental conditions and results are shown in Table 5.

TABLE 2

Properties of the Feedstock Oil

| | Middle-Eastern based mixed vacuum-distillation residual oil | Canadian Athabasca bitumen vacuum-distillation residual oil | Venezuela Cerro Negro atmospheric distillation residual oil | Mexican Maya vacuum-distillation residual oil |
|---|---|---|---|---|
| Density (kg/m$^3$) | 1033.4 | 1047.8 | 1034 | 1060.7 |
| S content (wt. %) | 4.02 | 6.04 | 4.29 | 5.34 |
| Residual Carbon content (wt. %) | 22.4 | 20.06 | 20.68 | 27.7 |
| Ni content (wt. ppm) | 53 | 115.1 | 125.4 | 130 |
| V content (wt. ppm) | 180 | 291.6 | 515.6 | 630 |
| Fe content (wt. ppm) | 19 | 580.3 | 41.2 | — |
| Heptane insoluble content (wt. %) | 9.08 | 11.38 | 12.59 | 23.5 |
| Average Molecular Weight | 1000 | — | 658 | — |
| Range of Boiling Point (%) | | | | |
| IBP–343° C. | 0 | 0 | 0 | 0 |
| 343–525° C. | 6.6 | 14.4 | 28.9 | 6 |
| 525° C. or higher | 93.4 | 85.6 | 71.1 | 94 |
| (Ni + V) ratio with respect to Middle-Eastern vacuum-distillation residual oil | 1 | 1.75 | 2.75 | 3.26 |

TABLE 3

| | | Example 1 | | Example 2 | | Example 3 | | Example 4 | |
|---|---|---|---|---|---|---|---|---|---|
| Conditions in Hydrocracking and Results | | First Process | Second Process | First Process | Second Process | First Process | Second Process | First Process | Second Process |
| Amount of carried Iron | (wt. %) | 10 | 10 | 10 | 10 | 10 | 10 | 10 | 10 |
| Amount of Iron-carrying Active Carbon | (wt. %) | 25.0 | 25.0 | 25.0 | 25.0 | 25.0 | 25.0 | 25.0 | 25.0 |

TABLE 3-continued

| | | | | | | | | | |
|---|---|---|---|---|---|---|---|---|---|
| Reaction Pressure | (MPaG) | 10 | 10 | 10 | 10 | 10 | 10 | 10 | 10 |
| Reaction Temperature | (° C.) | 418 | 434 | 417 | 428 | 414 | 420 | 413 | 415 |
| Retained Time | (h) | 4.7 | 4.7 | 4.5 | 4.5 | 4.5 | 4.5 | 3.7 | 3.7 |
| Conversion Rate | (%) | — | 88.4 | — | 83.8 | — | 74.1 | — | 63.4 |
| Gases | (wt. %) | — | 16.8 | — | 15.7 | — | 10.0 | — | 8.7 |
| Naphtha (IBP–171° C.) | (wt. %) | — | 12.1 | — | 10.5 | — | 8.4 | — | 4.8 |
| Kerosine (171–232° C.) | (wt. %) | — | 13.9 | — | 11.8 | — | 9.2 | — | 6.7 |
| Light Gas Oil (232–343° C.) | (wt. %) | — | 24.3 | — | 21.2 | — | 19.0 | — | 15.4 |
| Heavy Gas Oil (343–525° C.) | (wt. %) | — | 21.3 | — | 24.5 | — | 27.5 | — | 27.6 |
| Residual Oil (525° C.–) | (wt. %) | — | 11.6 | — | 16.2 | — | 0.22 | — | 36.6 |
| Amount of Produced Coke | (wt. %) | — | 0.08 | — | 0.16 | — | — | — | 0.09 |
| Ni Removal Rate | (%) | — | — | — | — | — | — | — | 80.0 |
| V Removal Rate | (%) | — | — | — | — | — | — | — | 92.0 |
| Ni + V Removal Rate | (%) | — | — | — | — | — | — | — | 89.3 |
| Desulfurization Rate | (%) | — | — | — | 77.8 | — | — | — | 61.9 |
| Residual Carbon Decomposition Rate | (%) | — | 77.1 | — | 73.2 | — | — | — | 50.5 |
| Asphaltene Decomposition Rate | (%) | — | 86.8 | — | 77.4 | — | 61.8 | — | 53.2 |
| Nisseki-type Spot Test | (—) | — | 4 | — | 5 | — | 3 | — | 2 |
| Softening Point of Residual Oil | (° C.) | — | 88.4 | — | 71.6 | — | 57.3 | — | 50.2 |

| | | Example 5 | | Example 6 | | Example 7 | | Comparative |
|---|---|---|---|---|---|---|---|---|
| Conditions in Hydrocracking and Results | | First Process | Second Process | First Process | Second Process | First Process | Second Process | Example 3 One Process |
| Amount of carried Iron | (wt. %) | 10 | 10 | 10 | 10 | 10 | 10 | 10 |
| Amount of Iron-carrying Active Carbon | (wt. %) | 25.0 | 25.0 | 25.0 | 25.0 | 25.0 | 25.0 | 25.0 |
| Reaction Pressure | (MPaG) | 10 | 10 | 10 | 10 | 10 | 10 | 10 |
| Reaction Temperature | (° C.) | 415 | 424 | 416 | 426 | 414 | 427 | 433 |
| Retained Time | (h) | 3.9 | 3.9 | 4.2 | 4.2 | 4.5 | 4.5 | 4.2 |
| Conversion Rate | (%) | — | 74.9 | — | 79.0 | — | 79.2 | 74.5 |
| Gases | (wt. %) | — | 11.5 | — | 14.1 | — | 12.6 | 10.9 |
| Naphtha (IBP–171° C.) | (wt. %) | — | 8.3 | — | 7.5 | — | 8.1 | 8.0 |
| Kerosine (171–232° C.) | (wt. %) | — | 9.3 | — | 10.3 | — | 10.5 | 9.9 |
| Light Gas Oil (232–343° C.) | (wt. %) | — | 18.8 | — | 20.2 | — | 20.8 | 20.1 |
| Heavy Gas Oil (343–525° C.) | (wt. %) | — | 26.8 | — | 26.7 | — | 26.8 | 25.2 |
| Residual Oil (525° C.-) | (wt. %) | — | 25.1 | — | 21.0 | — | 20.8 | 25.5 |
| Amount of Produced Coke | (wt. %) | — | 0.25 | — | 0.17 | — | 0.32 | 0.39 |
| Ni Removal Rate | (%) | — | 80.5 | — | 86.4 | — | 82.0 | — |
| V Removal Rate | (%) | — | 94.3 | — | 96.3 | — | 95.8 | — |
| Ni + V Removal Rate | (%) | — | 91.2 | — | 94.1 | — | 92.6 | — |
| Desulfurization Rate | (%) | — | 70.4 | — | 75.2 | — | 74.5 | — |
| Residual Carbon Decomposition Rate | (%) | — | 60.7 | — | 65.7 | — | 66.3 | — |
| Asphaltene Decomposition Rate | (%) | — | 57.8 | — | 66.1 | — | 63.7 | 59.4 |
| Nisseki-type Spot Test | (—) | — | 3 | — | 3 | — | 3 | 4 |
| Softening Point of Residual Oil | (° C.) | — | 61.2 | — | 65.0 | — | 68.2 | 64.0 |

TABLE 4

| | | Oil Source | | | | | |
|---|---|---|---|---|---|---|---|
| | | Canadian Athabasca bitumen vacuum-distillation residual oil | | | | | |
| | | Example 8 | | Example 9 | | Example 10 | |
| Conditions in Hydrocracking and Results | | First Process | Second Process | First Process | Second Process | First Process | Second Process |
| Amount of carried Iron | (wt. %) | 10 | 10 | 10 | 10 | 10 | 10 |
| Amount of Iron-carrying Active Carbon | (wt. %) | 25.0 | 25.0 | 25.0 | 25.0 | 25.0 | 25.0 |
| Reaction Pressure | (MPaG) | 10 | 10 | 10 | 10 | 10 | 10 |
| Reaction Temperature | (° C.) | 416 | 426 | 414 | 429 | 417 | 434 |
| Retained Time | (h) | 4.6 | 4.6 | 4.6 | 4.6 | 4.5 | 4.5 |
| Conversion Rate | (%) | | 76.1 | | 80.0 | | 83.7 |
| Gases | (wt. %) | | 14.5 | | 16.9 | | 18.2 |
| Naphtha (IBP–171° C.) | (wt. %) | | 8.4 | | 11.5 | | 13.0 |
| Kerosine (171–232° C.) | (wt. %) | | 10.9 | | 11.4 | | 13.2 |
| Light Gas Oil (232–343° C.) | (wt. %) | | 20.8 | | 20.4 | | 20.8 |
| Heavy Gas Oil (343–525° C.) | (wt. %) | | 20.9 | | 19.5 | | 18.0 |
| Residual Oil (525° C.-) | (wt. %) | | 23.9 | | 20.0 | | 16.3 |
| Amount of Produced Coke | (wt. %) | | 0.6 | | 0.3 | | 0.5 |
| Ni Removal Rate | (%) | | 79 | | 83 | | 84 |
| V Removal Rate | (%) | | 93 | | 94 | | 95 |

TABLE 4-continued

| | | | | |
|---|---|---|---|---|
| Ni + V Removal Rate | (%) | 89.0 | 90.9 | 91.9 |
| Desulfurization Rate | (%) | 75 | 78 | 80 |
| Residual Carbon Decomposition Rate | (%) | 65 | 66 | 68 |
| Asphaltene Decomposition Rate | (%) | 74 | 80 | 81 |
| Nisseki-type Spot Test | (—) | — | — | — |
| Softening Point of Residual Oil | (° C.) | 60.5 | 68.1 | 75.7 |

| | | Oil Source |||||
|---|---|---|---|---|---|---|
| | | Venezuelan Cerro Negro atmospheric distillation residual oil |||||
| | | Example 11 || Example 12 || Example 13 ||
| Conditions in Hydrocracking and Results | | First Process | Second Process | First Process | Second Process | First Process | Second Process |
| Amount of carried Iron | (wt. %) | 10 | 10 | 10 | 10 | 10 | 10 |
| Amount of Iron-carrying Active Carbon | (wt. %) | 25.0 | 25.0 | 25.0 | 25.0 | 25.0 | 25.0 |
| Reaction Pressure | (MPaG) | 10 | 10 | 10 | 10 | 10 | 10 |
| Reaction Temperature | (° C.) | 419 | 436 | 414 | 413 | 414 | 423 |
| Retained Time | (h) | 4.6 | 4.6 | 4.7 | 4.7 | 4.8 | 4.8 |
| Conversion Rate | (%) | | 88.3 | | 79.5 | | 84.1 |
| Gases | (wt. %) | | 22.4 | | 11.0 | | 14.8 |
| Naphtha (IBP–171° C.) | (wt. %) | | 14.7 | | 6.2 | | 9.2 |
| Kerosine (171–232° C.) | (wt. %) | | 14.5 | | 8.8 | | 11.0 |
| Light Gas Oil (232–343° C.) | (wt. %) | | 20.9 | | 20.8 | | 21.9 |
| Heavy Gas Oil (343–525° C.) | (wt. %) | | 15.5 | | 32.5 | | 26.8 |
| Residual Oil (525° C.-) | (wt. %) | | 11.7 | | 20.6 | | 15.9 |
| Amount of Produced Coke | (wt. %) | | 0.3 | | 0.1 | | 0.4 |
| Ni Removal Rate | (%) | | 91 | | 87 | | 87 |
| V Removal Rate | (%) | | 95 | | 93 | | 95 |
| Ni + V Removal Rate | (%) | | 93.9 | | 91.8 | | 93.4 |
| Desulfurization Rate | (%) | | 82 | | 69 | | 72 |
| Residual Carbon Decomposition Rate | (%) | | 72 | | 60 | | 65 |
| Asphaltene Decomposition Rate | (%) | | 84 | | 75 | | 80 |
| Nisseki-type Spot Test | (—) | | — | | — | | — |
| Softening Point of Residual Oil | (° C.) | | 89.0 | | 67.6 | | 83.6 |

| | | Oil Source |||||
|---|---|---|---|---|---|---|
| | | Mexican Maya vacuum-distillation residual oil |||||
| | | Example 14 || Example 15 || Example 16 ||
| Conditions in Hydrocracking and Results | | First Process | Second Process | First Process | Second Process | First Process | Second Process |
| Amount of carried Iron | (wt. %) | 10 | 10 | 10 | 10 | 10 | 10 |
| Amount of Iron-carrying Active Carbon | (wt. %) | 25.0 | 25.0 | 25.0 | 25.0 | 25.0 | 25.0 |
| Reaction Pressure | (MPaG) | 10 | 10 | 10 | 10 | 10 | 10 |
| Reaction Temperature | (° C.) | 415 | 428 | 414 | 414 | 415 | 433 |
| Retained Time | (h) | 4.7 | 4.7 | 4.7 | 4.7 | 4.7 | 4.7 |
| Conversion Rate | (%) | | 88.2 | | 66.4 | | 88.0 |
| Gases | (wt. %) | | 15.9 | | 10.0 | | 20.0 |
| Naphtha (IBP–171° C.) | (wt. %) | | 11.6 | | 6.0 | | 10.0 |
| Kerosine (171–232° C.) | (wt. %) | | 12.2 | | 7.5 | | 13.0 |
| Light Gas Oil (232–343° C.) | (wt. %) | | 22.7 | | 15.3 | | 22.7 |
| Heavy Gas Oil (343–525° C.) | (wt. %) | | 25.5 | | 27.5 | | 22.0 |
| Residual Oil (525° C.-) | (wt. %) | | 11.8 | | 33.6 | | 12.0 |
| Amount of Produced Coke | (wt. %) | | 0.3 | | 0.1 | | 0.3 |
| Ni Removal Rate | (%) | | 89 | | 81 | | 92.5 |
| V Removal Rate | (%) | | 97 | | 92 | | 98 |
| Ni + V Removal Rate | (%) | | 95.4 | | 90.1 | | 97.1 |
| Desulfurization Rate | (%) | | 82 | | 80 | | 91 |
| Residual Carbon Decomposition Rate | (%) | | 69 | | 56 | | 78 |
| Asphaltene Decomposition Rate | (%) | | 89 | | 58 | | 83 |
| Nisseki-type Spot Test | (—) | | — | | — | | — |
| Softening Point of Residual Oil | (° C.) | | 86.2 | | — | | — |

TABLE 5

| | | Oil Source | | | | | | | | | |
|---|---|---|---|---|---|---|---|---|---|---|---|
| | | Mexican Maya vacuum-distillation residual oil | | | | | | | | | |
| | | Example 17 | | Example 18 | | Comparative Example 4 | | Comparative Example 5 | | Example 19 | |
| Conditions in Hydrocracking and Results | | First Process | Second Process | First Process | Second Process | First Process | Second Process | First Process | Second Process | First Process | Second Process |
| Amount of carried Iron | (wt. %) | 5 | 5 | 18 | 18 | 0.8 | 0.8 | 23 | 23 | 10 | 10 |
| Amount of Iron-carrying Active Carbon | (wt. %) | 25 | 25 | 25 | 25 | 25 | 25 | 25 | 25 | 35 | 35 |
| Reaction Pressure | (MPaG) | 10 | 10 | 10 | 10 | 10 | 10 | 10 | 10 | 10 | 10 |
| Reaction Temperature | (° C.) | 415 | 432 | 415 | 433 | 415 | 431 | 414 | 430 | 415 | 431 |
| Retained Time | (h) | 4.6 | 4.6 | 4.8 | 4.8 | 4.7 | 4.7 | 4.7 | 4.7 | 4.6 | 4.6 |
| Conversion Rate | (%) | | 86.2 | | 84.2 | | 85.4 | | 89.6 | | 84.5 |
| Gases | (wt. %) | | 19.8 | | 19.1 | | 21.2 | | 21.3 | | 19.2 |
| Naphtha (IBP–171° C.) | (wt. %) | | 9.6 | | 9.5 | | 9.1 | | 10.8 | | 9.8 |
| Kerosine (171–232° C.) | (wt. %) | | 12.8 | | 12.2 | | 12.6 | | 13.6 | | 12.2 |
| Light Gas Oil (232–343° C.) | (wt. %) | | 22.1 | | 22 | | 21 | | 22.2 | | 21.8 |
| Heavy Gas Oil (343–525° C.) | (wt. %) | | 21.4 | | 21.1 | | 18.7 | | 18.5 | | 20.9 |
| Residual Oil (525° C.-) | (wt. %) | | 13.8 | | 14.5 | | 14.6 | | 10.4 | | 15.5 |
| Amount of Produced Coke | (wt. %) | | 0.5 | | 0.3 | | 2.8 | | 3.2 | | 0.6 |
| Ni Removal Rate | (%) | | 92.2 | | 91.2 | | 90 | | 91 | | 91.4 |
| V Removal Rate | (%) | | 97.7 | | 96.8 | | 95.5 | | 97.8 | | 95.8 |
| Ni + V Removal Rate | (%) | | 96.8 | | 95.8 | | 94.6 | | 96.6 | | 95.0 |
| Desulfurization Rate | (%) | | 89.1 | | 88.7 | | 87.8 | | 90 | | 89 |
| Residual Carbon Decomposition Rate | (%) | | 77.4 | | 77.6 | | 65.4 | | 62.5 | | 74.6 |
| Asphaltene Decomposition Rate | (%) | | 81.9 | | 80.5 | | 75.7 | | 70.9 | | 81.2 |

| | | Oil Source | | | |
|---|---|---|---|---|---|
| | | Mexican Maya vacuum-distillation residual oil | | | |
| | | Example 20 | | Comparative Example 6 | |
| Conditions in Hydrocracking and Results | | First Process | Second Process | First Process | Second Process |
| Amount of carried Iron | (wt. %) | 10 | 10 | 10 | 10 |
| Amount of Iron-carrying Active Carbon | (wt. %) | 10 | 10 | 4 | 4 |
| Reaction Pressure | (MPaG) | 10 | 10 | 10 | 10 |
| Reaction Temperature | (° C.) | 414 | 430 | 415 | 430 |
| Retained Time | (h) | 4.7 | 4.7 | 4.7 | 4.7 |
| Conversion Rate | (%) | | 84.1 | | 82.7 |
| Gases | (wt. %) | | 19.1 | | 17.7 |
| Naphtha (IBP–171° C.) | (wt. %) | | 9.9 | | 10.2 |
| Kerosine (171–232° C.) | (wt. %) | | 12 | | 11.9 |
| Light Gas Oil (232–343° C.) | (wt. %) | | 21.6 | | 20.3 |
| Heavy Gas Oil (343–525° C.) | (wt. %) | | 20.8 | | 16.8 |
| Residual Oil (525° C.-) | (wt. %) | | 15.9 | | 17.3 |
| Amount of Produced Coke | (wt. %) | | 0.5 | | 5.8 |
| Ni Removal Rate | (%) | | 91.1 | | 86.3 |
| V Removal Rate | (%) | | 96 | | 91.8 |
| Ni + V Removal Rate | (%) | | 95.2 | | 90.9 |
| Desulfurization Rate | (%) | | 88.4 | | 85.3 |
| Residual Carbon Decomposition Rate | (%) | | 78 | | 58.9 |
| Asphaltene Decomposition Rate | (%) | | 80.1 | | 69.2 |

TABLE 6

| | Oil Source Middle-Eastern based atmospheric distillation residual oil | |
|---|---|---|
| | Referential Example 1 | Referential Example 2 |
| Feedstock Oil | Atmospheric Distillation Residual Oil | Atmospheric Distillation Residual Oil |
| Sulfur (%) | 4.2 | 4.2 |
| Nitrogen (%) | 0.8 | 0.8 |
| Ni (ppm) | 32 | 32 |
| V (ppm) | 104 | 104 |
| Residual Carbon (%) | 12 | 12 |
| Reaction Method | Fixed-Bed | Fixed-Bed |
| Catalyst | CoMo/carbon | CoMo/$Al_2O_3$ |
| Temperature (° C.) | 412 | 412 |
| Pressure (MPaG) | 10 | 10 |
| LHSV ($h^{-1}$) | 0.25 | 0.38 |
| Conversion Rate | 52 | 50 |
| Ni Removal Rate (%) | 69 | 56 |
| V Removal Rate (%) | 92 | 75 |
| Desulfurization Rate (%) | 64 | 81 |
| Residual Carbon Decomposition Rate (%) | 43 | 50 |

TABLE 7

| | | Oil Source Middle-Eastern based mixed vacuum-distillation residual oil | | |
|---|---|---|---|---|
| | | Comparative Example 1 | | Comparative Example 2 |
| | | First Process | Second Process | One Process |
| Amount of Brown Coal Char | (wt. %) | 4 | — | — |
| Amount of Active Carbon | (wt. %) | — | 5 | — |
| Amount of Natural Pyrite | (wt. %) | 3 | — | — |
| Amount of Iron-carrying Active Carbon | (wt. %) | — | — | 5 |
| Reaction Temperature | (° C.) | 435 | 435 | 435 |
| Reaction Time | (h) | 0.9 | 2.1 | 1.5 |
| Conversion Rate | (%) | 71.5 | 88.2 | 84.1 |
| Gases | (wt. %) | — | 13.2 | 9.4 |
| Naphtha (IBP–171° C.) | (wt. %) | — | 13.1 | 15.2 |
| Kerosine (171–232° C.) | (wt. %) | — | 10.7 | 10.8 |
| Light Gas Oil (232–343° C.) | (wt. %) | — | 20.9 | 18.5 |
| Heavy Gas Oil (343–525° C.) | (wt. %) | — | 27.4 | 20.2 |
| Residual Oil (525° C.) | (wt. %) | — | 11.3 | 15.6 |
| Amount of Produced Coke | (wt. %) | 3.2 | 0.2 | 10.3 |

When the aforementioned Examples are compared with the Comparative Examples, it is obvious that Examples 1 and 2 exhibit less amounts of coke generation than Comparative Examples 1 and 2. Accordingly, it is understood that the method of the present invention effectively suppresses generation of coke in hydrocracking.

When the stability of the decomposed oil in Example 3 in which the processing was carried out at two stages according to the present invention is compared, on the basis of the results of the Nisseki-type spot test, with the stability of the cracked oil in Comparative Example 3 in which the processing was carried out at one-stage, Example 3 of two-stage processing got No. 3 while Comparative Example 3 of one-stage processing got No. 4, although Example 3 and Comparative Example 3 both show the same conversion rate. Accordingly, it is understood that Example 3 exhibits a more excellent stability of the cracked oil.

Further, in Example 2, a cracked oil in a stable state in which precipitation of sludge and the like are less likely to occur was produced as a result of the processing at the first process. Then the reaction can further proceed in the second process until a relatively high conversion rate is achieved. As compared with the one-stage processing in Comparative Example 3, the reaction in Example 2 can proceed in a more stable manner until a relatively high conversion rate is achieved, although the reaction temperature is the same in Example 2 and Comparative Example 3.

In Examples 4–7, the heavy metal (Ni+V) removal rate is significantly high (90–94%, approximately) and the residual carbon content in the produced oil and asphaltene defined as the heptane insoluble content are removed by decomposition as the conversion rate increases. Also, the softening point of the residual oil having a boiling point no lower than 525° C. is stable up to the high conversion rate area and the generation of coke is suppressed. Accordingly, it is understood that the catalysts used in Examples 4–7 are very excellent ones.

In cases in which extraheavy oils having a relatively high heavy metal (Ni, V) concentration are used as the feedstock, as shown in Examples 8–11, Examples 12–14 and Examples 15 and 16, the heavy metal (Ni+V) removal rate is also significantly high (90–97%, approximately) and the residual carbon content in the produced oil and asphaltene defined as the heptane insoluble content are removed by decomposition as the conversion rate increases. Also, the generation of coke is suppressed. Accordingly, it is understood that the catalysts used in these Examples show excellent performances in processing extraheavy oils.

As shown in Examples 16, 17 and 18, when the amount of carried iron with respect to active carbon is 10 wt. %, 5 wt. % and 18 wt. %, respectively, hydrocracking at a relatively high conversion rate in which coke generation is less likely to occur is possible. On the other hand, in Comparative Example 4, as the amount of carried iron with respect to active carbon is 0.8 wt. % and the hydrogen-addition effect of iron is insufficient, the amount of produced coke is relatively high (2.8 wt. %).

In Comparative Example 5, the amount of carried iron with respect to active carbon is relatively large (23 wt. %). In this case, however, dispersion of iron carried on active carbon is deteriorated and iron sulfide as the catalytically active species is not formed sufficiently after reduction was carried out in the reaction site. Accordingly, coke generation in Comparative Example 5 is relatively high (3.2 wt. %).

As shown in Examples 16, 19 and 20, when the concentration of the catalyst with respect to the processed oil is 25 wt. %, 35 wt. % and 10 wt. %, respectively, hydrocracking at 36. a relatively high conversion rate in which coke generation is less likely to occur is possible. On the other hand, as shown in Comparative Example 6, in a case in which the concentration of the catalyst is 4 wt. % with respect to the processed oil and when extraheavy oils which contain a particularly large amount of asphaltene (Maya vacuum residual oil in Mexico, for example) is used, the amount of coke produced by polycondensation is relatively high (5.8 wt. %).

When the catalyst is used as a catalyst to be charged in "a guard reactor", which is provided upstream of the desulfurization process and the like in order to remove heavy metals in the heavy oils, the conventional catalyst of CoMo/alumina carrier described in the reference, Lillian A. Rankel, Energy & Fuels 1993, 7, 937–942, shows a conversion rate of 50 wt. %, which is suppressed at a relatively low level in order to prevent generation of coke, as shown in Referential Example 2 in Table 6. In addition, the Ni removal rate, the V removal rate and the residual carbon removal rate of Referential Example 2 are low as shown in Table 6. Therefore, as is understood from Example 4, the catalyst of the present invention shows excellent performances.

What is claimed is:

1. A method of hydrocracking a heavy oil including at least one of asphaltene, residual carbon, nickel and vanadium in a reactor comprising the steps of contacting the heavy oil with a catalyst comprising iron and active carbon having an MCH conversion rate of 40–80%, specific surface area of 600–1000 m$^2$/g, pore volume of 0.5–1.4 cm$^3$/g, 2–50 nm mesopore volume of not less than 60% and average pore diameter of 3–6 nm, the iron being carried on the active carbon in an amount of 1–20 wt. % with respect to the active carbon.

2. The method of claim 1, wherein the catalyst consists of iron and the active carbon.

3. The method of claim 1, wherein the catalyst has not been subjected to a pre-sulfurization reaction.

4. The method of claim 1, wherein the heavy oil is at least one member selected from the group consisting of Middle-Eastern based Arabian heavy, Basra, Kafdi, Iranian heavy, vacuum residual oils, atmospheric distillation residual oils, Canadian Athabasca Bitumen Vacuum Distillation Residual Oils, Venezuelan Cerro Negro Atmospheric Distillation Residual Oils and Mexican Maya Vacuum Distillation Residual Oils.

5. The method of claim 1, wherein heavy metals are removed during the contacting step.

6. The method of claim 1, wherein at least one of nickel and vanadium are removed during the contacting step.

7. The method of claim 1, wherein asphaltene is removed during the contacting step.

8. The method of claim 1, wherein coke generation is suppressed.

9. The method of claim 1, comprising a first step of conducting hydrocracking at a temperature of from 360–450° C. and at a hydrogen partial pressure of 2–14 MPaG and a second step of conducting hydrocracking at a temperature of from 400–480° C. and at a hydrogen partial pressure of from 2–18 MPaG, the catalyst being present during the first and second steps and the first step being conducted under a different reaction condition than the second step.

10. The method of claim 9, wherein the concentration of the catalyst is 6–40 wt. % with respect to oil in the first and second steps.

11. The method of claim 1, wherein the catalyst consists essentially of iron and the active carbon.

12. The method of claim 1, wherein the heavy oil is a distillation residual oil.

13. The method of claim 9, wherein the first step is conducted at a lower temperature than the second step.

14. The method of claim 1, wherein the catalyst is maintained in a fluid state and homogeneously dispersed in the reactor.

15. The method of claim 1, wherein the heavy oil contains a heptane-insoluble matter in an amount of 9.08 to 23.5 wt. %.

16. The method of claim 1, wherein the heavy oil contains at least one of nickel and vanadium in a total amount of 233 to 760 ppm by weight.

17. The method of claim 1, wherein the heavy oil contains fractions having a boiling point of not lower than 525° C. in an amount of from 71.1 to 93.4% by volume.

18. A method of hydrocracking a distillation residual oil including at least one of asphaltene, residual carbon, nickel and vanadium in a reactor comprising a first step of conducting hydrocracking of the distillation residual oil at a temperature of from 360–450° C. and at a hydrogen partial pressure of 2–14 MPaG in the presence of a catalyst maintained in a fluid state and homogeneously dispersed in the reactor, the catalyst comprising iron and active carbon having an MCH conversion rate of 40–80%, specific surface area of 600–1000 m$^2$/g, pore volume of 0.5–1.4 cm$^3$/g, 2–50 nm mesopore volume of not less than 60% and average pore diameter of 3–6 nm, the iron being carried on the active carbon in an amount of 1–20 wt. % with respect to the active carbon, and a second step of conducting hydrocracking in the presence of the catalyst, at a temperature of from 400–480° C. and at a hydrogen partial pressure of from 2–18 MPaG, the first step being conducted at than the second step.

19. The method of claim 18, wherein the catalyst consists of iron and the active carbon.

20. The method of claim 18, wherein the catalyst carbon of iron and the active carbon.

21. The method of claim 1, wherein the active carbon has not been subjected to a phosphorus treatment.

22. The method of claim 18, wherein the active carbon has not been subjected to a phosphorus treatment.

* * * * *

UNITED STATES PATENT AND TRADEMARK OFFICE
CERTIFICATE OF CORRECTION

PATENT NO. : 6,797,153 B1
DATED : September 28, 2004
INVENTOR(S) : Hidetsugu Fukuyama et al.

It is certified that error appears in the above-identified patent and that said Letters Patent is hereby corrected as shown below:

<u>Column 22,</u>
Line 42, after "conducted at" insert -- a lower temperature --.
Line 43, after "catalyst consists" insert -- essentially --.
Line 45, change "catalyst carbon" to -- catalyst consists --.

Signed and Sealed this

Eighteenth Day of October, 2005

JON W. DUDAS
*Director of the United States Patent and Trademark Office*